(No Model.)

T. G. MALTBY.
FRUIT CLIPPING SHEARS.

No. 459,409. Patented Sept. 15, 1891.

Witnesses
A. Norwood
Robt. Thomas.

Inventor
Theodore G. Maltby
By his Attorneys
E. P. Gorton

UNITED STATES PATENT OFFICE.

THEODORE G. MALTBY, OF ST. PETERSBURG, FLORIDA.

FRUIT-CLIPPING SHEARS.

SPECIFICATION forming part of Letters Patent No. 459,409, dated September 15, 1891.

Application filed March 31, 1891. Serial No. 387,183. (No model.)

*To all whom it may concern:*

Be it known that I, THEODORE G. MALTBY, a citizen of the United States, residing at St. Petersburg, in the county of Hillsborough and State of Florida, have invented certain new and useful Improvements in Fruit-Clipping Shears, of which the following specification, in connection with the drawings, is a sufficiently full, clear, and exact description thereof to enable others skilled in the art to which it appertains to make and use the same.

This invention relates to a device for picking fruit or flowers, which it is desirable to save as much as possible from bruising, and other work where it may be applicable, the object being to provide a simple, cheap, and easily-operated device by means of which the stem of the fruit may be clipped and held with its fruit and again smoothly reclipped next the fruit, thus severing the bruised portion of the stem held by the clipper-jaws, and directly dropping the fruit therefrom to a basket or tray for its reception.

My invention consists in the construction and arrangement of the several parts as herein set forth and claimed, whereby these beneficial results are accomplished and the objectionable features of leaving the stem bruised, handling the fruit, using both hands in the work, &c., heretofore existing are overcome. The illustrations present a pair of clipping-shears constructed to meet the requirements of these improvements. Similar parts, however, may be made attachable to the more common clipping-shears in use, answering a like purpose; but such modification I consider within the scope of my invention.

Figure 1:
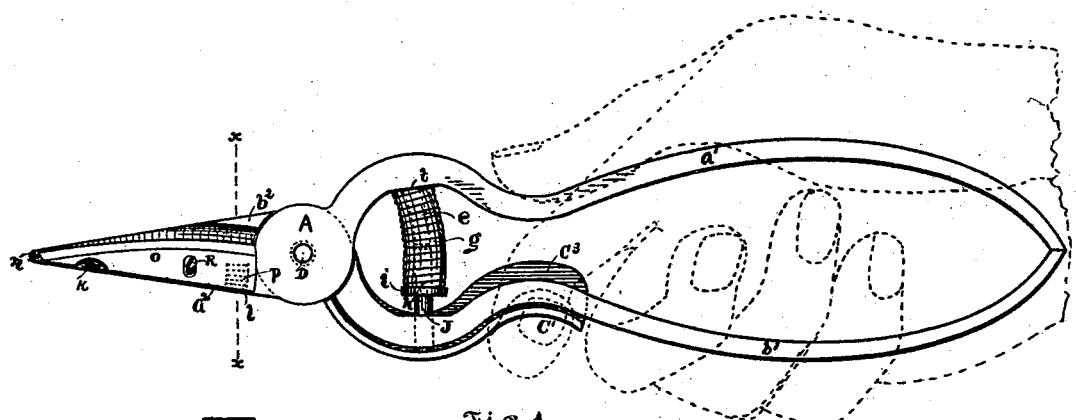
Figure 4:
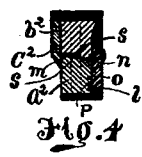
Figure 2:
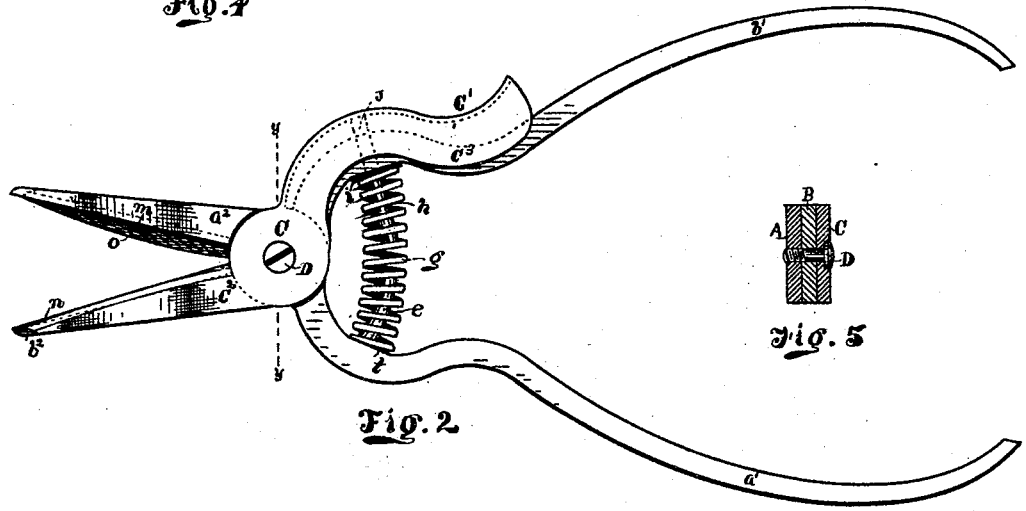
Figure 5:
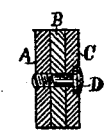
Figure 3:
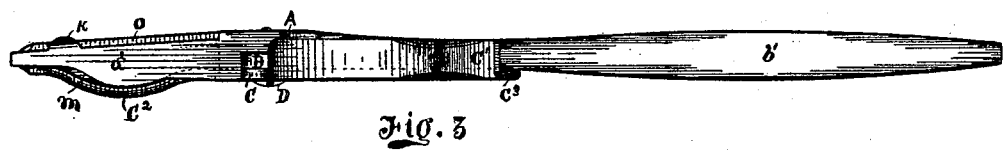

With reference to the drawings, Figure 1 is a side elevation of the clippers as closed by the hand, shown in dotted lines. Fig. 2 is an elevation of the opposite side in normal position. Fig. 3 is a plan view of the edge of Fig. 2. Fig. 4 is a section on line $x\ x$, Fig. 1; and Fig. 5 a section on line $y\ y$, Fig. 2.

In the following description like letters of reference indicate corresponding parts.

The circular parts represented by the letters A B C, I will term the "stock parts" of the clipper. These parts are held in union by the bolt D, which passes sidewise centrally through them all, forming a pivot or fulcrum upon which they slightly revolve to open or close the parts departing therefrom. Extending in direction of the hand from each of said stock parts continues the hand-levers $a'$ $b'$ $c'$. These levers as they depart from their adjoining stock parts are of irregular form and rise and fall from a line that might be drawn, by way of explanation, straight from their free back end to the bolt D, upon which they are, through medium of their stock parts, equally fulcrumed. The first rise or irregularity thus given said hand-levers is proximately semi-circular, rising forward of the hand gripping them in use, and is designed to prevent the hand from slipping forward upon the slack parts and to receive in the space of the circle thus arranged between the levers room for the spring $g$, with enough coils to durably react and meet the proper expansion necessary in opening the clippers. Back of this the other following rise or curvature to the free end of the levers $a'$ $b'$ conforms to the hollow of the hand and in all connections serves to easily retain the pressure at the parts giving the best leverage. The lever $C'$ closely follows the outside of one of the longer levers to a point convenient to be acted upon by the index-finger of the hand and is provided throughout its length and along the side of the accompanying lever with an inward side flange $c^3$ to prevent pinching the hand or tender shoots between the levers.

$a^2\ b^2$ represent the gripping-jaws of the clipper, which extend forward and taper to a point from the intervening stock parts A B. The jaw $a^2$ has a clipping-blade $o$ secured thereto along its outer side, and the cutting-edge of said blade slightly rises above the face of said jaw and is actuated thereby with scissors-like movement passing the resisting edge $n$ of the opposing jaw $b^2$. The inner gripping or meeting faces $s$ of the jaws $a^2\ b^2$ have an opposite reversed cyma reversa curvature throughout their length; but such curvature may be dispensed with without impairing their practicability or efficiency in gripping a stem or twig while being severed.

The reclipping-blade $c^2$ is provided with an outward convex curvature along its length and is actuated by the lever $c'$, (see Fig. 3,) with scissors-like movement, passing the outer convex opposing edge $m$ of $a^2$. The purpose of giving outward curve to said reclipping-blade is to provide means for clipping the stem closely within the hollow of deep-stemmed fruit. In general use, however, for cheapness of construction this feature of curvature to the reclipping parts may be dispensed with, as most fruit desirable to pick in this manner—such as grapes and oranges—do not require it.

Projecting inward from the lever $a'$, near its stock part and within the circle heretofore described, is the spur or stud $e$, designed to project within and retain upon its base for reaction the end coil of a spiral spring $g$. A like stud $h$, provided with a thin flange or shoulder $i$, encircling it and against which the opposite end coil of the same spring rests, has a continued opposite stud or plunger J movably inserted through the lever $b'$, with its end resting against the inner side of the auxiliary lever $c'$, the flange $i$ of the stud meeting the lever $b'$ and the end of the plunger. The lever $c'$ conveys the action of the spring to each at the proper time in its operation.

The blade $o$ is so attached to the jaw which carries it as to make its cutting-edge adjustable in relation to the distance upward from the face of said jaw. Such adjustable feature I accomplish by means of the rounded boss $k$, projecting under the blade from near the forward end of the jaw $a^2$, and over which the blade may rock as its wider or back end is raised or lowered by having the projecting lip $l$ inward from its lower back corner, and two or more notches P, corresponding thereto in the jaw and designed to fit and receive in either of them said lip. The screw R, passing through $a$ across elongated opening in the blade between the boss and lip, serves to retain the blade rigid with the jaw in its adjustment.

To complete the description, we will now follow the operation, which is as follows: Placing the forward jaws of the triple stock parts upon the stem to be cut, the gripping-jaws $a^2 b^2$ are brought together by the pressure given their respective levers against the action of the spring upon the studs between them, and the blade $o$, slightly in advance of the jaw which carries it, is brought up uniformly therewith, till meeting the stem to be cut it presses it against the cutting-edge of the opposing jaw and severs it. The meeting of the jaws upon the stem at this time, or so quickly following, prevents its escape. A pressure is now given the lever $c'$, further compressing the spring $g$ through medium of the plunger J, and its recutting-blade $c^2$, following the jaw $b^2$, is brought down upon the stem next the fruit, recutting the stem as it is carried over the opposing convex cutting-edge of the jaw below. The pressure of the levers now being released, the spring, through the plunger J, returns the recutting-blade $c^2$ in line with jaw $b^2$, and continued expansion of the spring on the flange of the plunger returns the jaws to their normal position.

Having thus minutely described my improvements, what I claim, and wish to secure by Letters Patent of the United States, is—

1. The combination of the clipping-shears having the pivoted stock parts A B, with levers $a'$ $b'$ and pressure-jaws $a^2 b^2$, the knife $o$, secured to one of the jaws and adapted to be carried across the face of the other jaw, and the auxiliary stock part C, with lever $c'$ and blade $c^2$, adapted to swing across the face on the opposite side of the jaws, substantially as described.

2. The combination, with the clipping-shears having the parts substantially as herein described, of the reclipping-blade $c^2$, pivoted upon the fulcrum-bolt of the shears between the blade and handle, substantially as described.

3. The combination, in clipping-shears, of a plunger reciprocating through one of its levers and actuated outwardly by a spring seated upon the other lever, and the reclipper pivoted to the shears, having blade $c^2$ and lever $c'$ and actuated by said lever under pressure of the hand and plunger, substantially as described.

4. The clipping-shears consisting of the intervening stock parts A B C, pivoted together on the bolt D between their adjoining levers, substantially as described, and the recutting-blade $c^2$, actuated by the shorter lever, said lever having a flange $c^3$ covering one of the longer levers, substantially as set forth.

5. The clipping-shears having the parts A B C fulcrumed on the bolt D, levers $a'$ $b'$ $c'$, jaws $a^2 b^2$, cutting-blade $o$, and recutting-blade $c^2$, said jaws having opposite cyma reversa inner faces, substantially as set forth.

6. The clipping-shears having the parts A B and their actuating members, substantially as described, in combination with part C, having lever $c'$ and recutting-blade $c^2$, said blade and jaw $a^2$ of the clipper having outward convex cutting-edges, substantially as described.

7. The clipping-shears having gripping-jaws $a^2 b^2$ and cutting-blades $o$ $c^2$, their stock parts, and their actuating-levers, in combination with the spring $g$ and plunger J, having a shoulder $i$ and reciprocating through the central lever against said shoulder and against the outer lever, with the spring compressed between said shoulder and opposite single lever, substantially as set forth.

8. In a pair of clipping-shears having the pressure-jaws $a^2 b^2$, the knife $o$, secured to one of the jaws and having adjustment in relation to the distance of its cutting-edge upward from the inner face of said jaw and adapted to be carried across the face of the other jaw, and the auxiliary blade $c^2$, adapted to swing across the opposite face on the opposite side of the jaws, substantially as described.

9. In a pair of clipping-shears having the parts substantially as herein described, the jaw $a^2$, having the boss K, and serrations P, in combination with the blade $o$ and screw R, said blade having a screw-slot and lip $l$ and fitted to rock upon the boss, substantially as set forth.

THEODORE G. MALTBY.

Witnesses:
ROBT. THOMAS,
A. NORWOOD.